United States Patent
Su

(10) Patent No.: US 11,941,035 B2
(45) Date of Patent: Mar. 26, 2024

(54) SUMMARY GENERATION MODEL TRAINING METHOD, APPARATUS, ELECTRONIC DEVICE AND NON-TRANSITORY COMPUTER READABLE STORAGE MEDIUM

(71) Applicant: BOE Technology Group Co., Ltd., Beijing (CN)

(72) Inventor: Shaoxun Su, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 332 days.

(21) Appl. No.: 17/556,735

(22) Filed: Dec. 20, 2021

(65) Prior Publication Data

US 2022/0318289 A1   Oct. 6, 2022

(30) Foreign Application Priority Data

Mar. 31, 2021   (CN) .......................... 202110349303.4

(51) Int. Cl.
*G06F 16/34* (2019.01)
*G06F 16/33* (2019.01)
*G06N 3/08* (2023.01)

(52) U.S. Cl.
CPC ........ *G06F 16/345* (2019.01); *G06F 16/3347* (2019.01); *G06N 3/08* (2013.01)

(58) Field of Classification Search
CPC ..... G06F 16/345; G06F 16/3347; G06N 3/08; G06N 3/045; G06N 3/0895; G06N 3/04
See application file for complete search history.

(56) References Cited

U.S. PATENT DOCUMENTS

2019/0362020 A1\* 11/2019 Paulus .............. G06F 18/24143

OTHER PUBLICATIONS

Dong et al. ("Unified Language Model Pre-training for Natural Language Understanding and Generation", 33rd Conference on Neural Information Processing Systems (NeurIPS 2019)) (Year: 2019).\*
J.E. Everett ("The exponentially weighted moving average applied to the control and monitoring of varying sample sizes" Computational Methods and Experimental Measurements XV, 2011) (Year: 2011).\*

\* cited by examiner

*Primary Examiner* — Bhavesh M Mehta
*Assistant Examiner* — Darioush Agahi
(74) *Attorney, Agent, or Firm* — IPro, PLLC

(57) ABSTRACT

The present application provides a summary generation model training method, apparatus, electronic device, and non-transitory computer readable storage medium. The summary generation model training method includes: obtaining a first vector set, where vectors in the first vector set are original encoding vectors which have been trained; generating a second vector set based on the first vector set, where the number of vectors in the second vector set is greater than the number of the vectors in the first vector set, and each vector in the second vector set is determined according to one or more vectors in the first vector set; and taking the vectors included in the first vector set and the vectors included in the second vector set as input encoding vectors to perform model training to obtain a summary generation model.

6 Claims, 3 Drawing Sheets

US 11,941,035 B2

SUMMARY GENERATION MODEL TRAINING METHOD, APPARATUS, ELECTRONIC DEVICE AND NON-TRANSITORY COMPUTER READABLE STORAGE MEDIUM

CROSS-REFERENCE TO RELATED APPLICATIONS

The present application claims a priority to the Chinese patent application No. 202110349303.4 filed in China on Mar. 31, 2021, a disclosure of which is incorporated herein by reference in its entirety.

TECHNICAL FIELD

The present application relates to the field of deep learning technologies, and in particular to a summary generation model training method, apparatus, electronic device and non-transitory computer readable storage medium.

BACKGROUND

Summary generation refers to a method of generating a summary for a certain length of text, and a summary generation method in the related art trains a deep learning model to obtain a summary generation model required for generating a summary. However, an input of the deep learning model in the related art is limited to a certain number of words, resulting in difficulty in generating summaries of long texts.

SUMMARY

The present application provides a summary generation model training method, apparatus, electronic device and non-transitory computer readable storage medium, which can reduce the difficulty in generating summaries of long texts.

In a first aspect, one embodiment of the present application provides a summary generation model training method, including:
  obtaining a first vector set; wherein vectors in the first vector set are original encoding vectors which have been trained;
  generating a second vector set based on the first vector set; wherein the number of vectors in the second vector set is greater than the number of the vectors in the first vector set, and each vector in the second vector set is determined according to one or more vectors in the first vector set; and
  taking the vectors included in the first vector set and the vectors included in the second vector set as input encoding vectors to perform model training to obtain a summary generation model;
  wherein the summary generation model is a neural network model with vectors of a text as input encoding vectors and a summary of the text as an output.

Optionally, the first vector set includes N vectors, and the second vector set includes N*N vectors, and N a positive integer.

Optionally, the generating a second vector set based on the first vector set, includes:
  determining the second vector set with the following formula:

$$q_{i \times n+j} = \alpha p_{(Imax+1-i)} + (1-\alpha) p_j;$$

wherein $q_{i \times n+j}$ is a vector in the second vector set; $p_{(Imax+1-i)}$ and $p_j$ are vectors in the first vector set; Imax is a maximum position number value of the original encoding vectors; $\alpha$ is a preset coefficient, $0 < \alpha < 1$, and $\alpha$ is not equal to 0.5.

Optionally, the taking the vectors included in the first vector set and the vectors included in the second vector set as input encoding vectors to perform model training to obtain a summary generation model, includes:
  in case that the number of words of the text for which a summary is needed to be generated, is less than or equal to a pre-set word number threshold, taking the vectors included in the first vector set as input encoding vectors to perform model training;
  in case that the number of words of the text for which the summary is needed to be generated, is greater than the pre-set word number threshold, sequentially arranging the vectors included in the first vector set and the vectors included in the second vector set as input encoding vectors to perform model training.

In a second aspect, one embodiment of the present application provides an electronic device including a processor and a memory; wherein the processor is configured to execute a program stored on the memory to implement the steps of the summary generation model training method in the first aspect.

In a third aspect, one embodiment of the present application provides a non-transitory computer-readable storage medium, including a computer program stored thereon; wherein the computer program is executed by a processor to cause the processor to implement the steps of the summary generation model training method in the first aspect.

In the embodiment of the present application, the second vector set is generated through trained original encoding vectors; since the second vector set is generated based on the first vector set, the second vector set has compatibility with the first vector set. Further, performing model training with the first vector set and the second vector set can increase a length of an input text, which facilitates generation of a summary of a long text.

BRIEF DESCRIPTION OF THE DRAWINGS

The foregoing and/or additional aspects and advantages of the present application will become apparent and easy to understand from the following description of the embodiments in conjunction with the accompanying drawings, in which.

DETAILED DESCRIPTION

Reference will now be made in detail to the exemplary embodiments of the present application, examples of which are illustrated in the accompanying drawings, wherein the various details of the embodiments of the present application are included to facilitate understanding and are to be considered as exemplary only. Accordingly, a person skilled in the art should appreciate that various changes and modifications can be made to the embodiments described herein without departing from the scope and spirit of the present application. Also, descriptions of well-known functions and structures are omitted from the following description for clarity and conciseness.

The present application provides a summary generation model training method.

The technical solution of one embodiment of the present application includes: obtaining a summary generation model through model training, where the summary generation model is a neural network model with a vector of a text as an input encoding vector and a summary of the text as an output. The summary generation model is configured to generate the summary of the text, especially generate a summary of a long text.

In the technical solution of one embodiment of the present application, an architecture of the summary generation model may be summarized as including a feature extraction sub-model and a summary generation sub-model. In one implementation, the feature extraction sub-model such as a pre-trained bidirectional encoder representations from transformers (Bert) model, extracts and obtains a feature of an original text; and then, based on the feature, the summary generation sub-model such as a unified pre-trained language model (UNILM) or a sequence to sequence model (Seq2Seq model, which is a neural network model) generates a summary of the text.

In the technical solution of one embodiment of the present application, training data is firstly obtained. The training data may be stored in a dictionary format. For example, in one embodiment, a format of the training data is data: {"summarization": "A", "article": "B"}, where "summarization" is a summary identifier; "article" is an original text identifier; "B" is an original text for which a summary needs to be generated; and "A" represents the summary of the original text "B".

The Seq2seq model is a unidirectional language model for text generation, which uses conditional probability distribution to learn and train prediction of contained knowledge. The conditional probability may be expressed with a formula: $p(x1, x2, x3, \cdots, xn)=p(x1)p(x2|x1)p(x3|x1, x2) \ldots p(xn|x1, \ldots, xn-1)$.

In the formula, $xi(i=1, 2, 3 \ldots N)$ sequentially represent a prediction result of an i-th word in sequence in an original text. When predicting x1, there is no external input; when predicting x2, only x1 can be input; when predicting x3, only x1 and x2 can be input, and so on; that is, the model is unidirectional.

Figure 1:
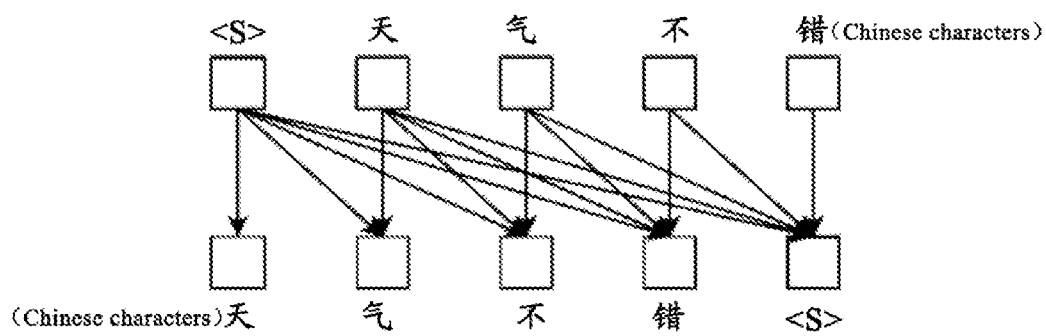
FIG. 1 is a schematic diagram of tokens in an embodiment of the present application.

As shown in FIG. 1, in one embodiment, for a Chinese sentence including Chinese characters " 天气不错 " ("it's nice weather"), x1 is corresponding to a Chinese character " 天 ", x2 is corresponding to a Chinese character " 气 ", and so on, <S> is a start sign, and <e> is an end sign. When predicting each token, only previous tokens can be relied on. It should be noted that the Chinese characters used in the present application are merely examples to illustrate the present application.

Figure 2:
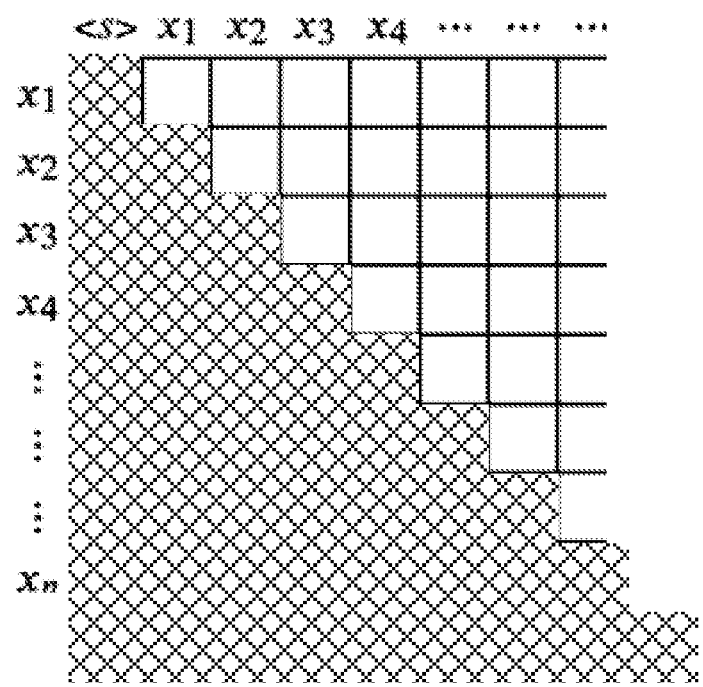
FIG. 2 is a schematic diagram of an attention matrix according to an embodiment of the present application.

The UNILM directly treats the Seq2Seq as a sentence complement in a way of masking an attention matrix. As shown in FIG. 2, each row of the attention matrix actually represents an output, each column of the attention matrix represents an input, and the attention matrix represents an association of outputs and inputs. Assuming that white squares all represent 0, then the first row indicates that x1 is only associated with the start sign <s>; the second row 2 indicates that x2 is only associated with the start sign <s> and x2, and so on. Therefore, it is only necessary to introduce a lower triangular mask into the attention matrix of the Bert model and stagger the input and output by one bit for training, thereby realizing one unidirectional language model.

Figure 3:
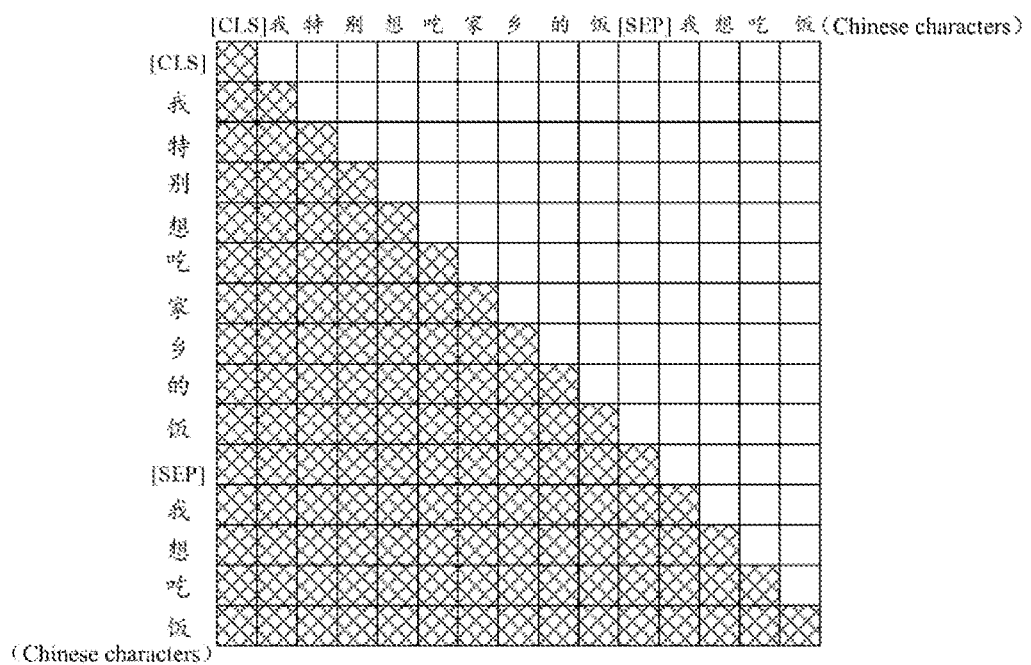
FIG. 3 is a schematic diagram of another attention matrix according to an embodiment of the present application.

For example, an input is Chinese characters " 我特别想吃家乡的饭 " ("I especially want to eat rice from my hometown"), and a target sentence is Chinese characters " 我想吃饭 " ("I want to eat rice"), then, the UNILM joints these two sentences into one sentence of Chinese characters "[CLSRM]我特别想吃家乡的饭[SEP] 我想吃饭[SEP]". After such transformation, the simplest solution is to train a language model, as shown in FIG. 3, "[CLS] 我特别想吃家乡的饭[SEP]我想吃饭[SEP]" are input into the language model to predict the Chinese characters " 我想吃饭 " character by character until "SEP" appears.

Figure 4:
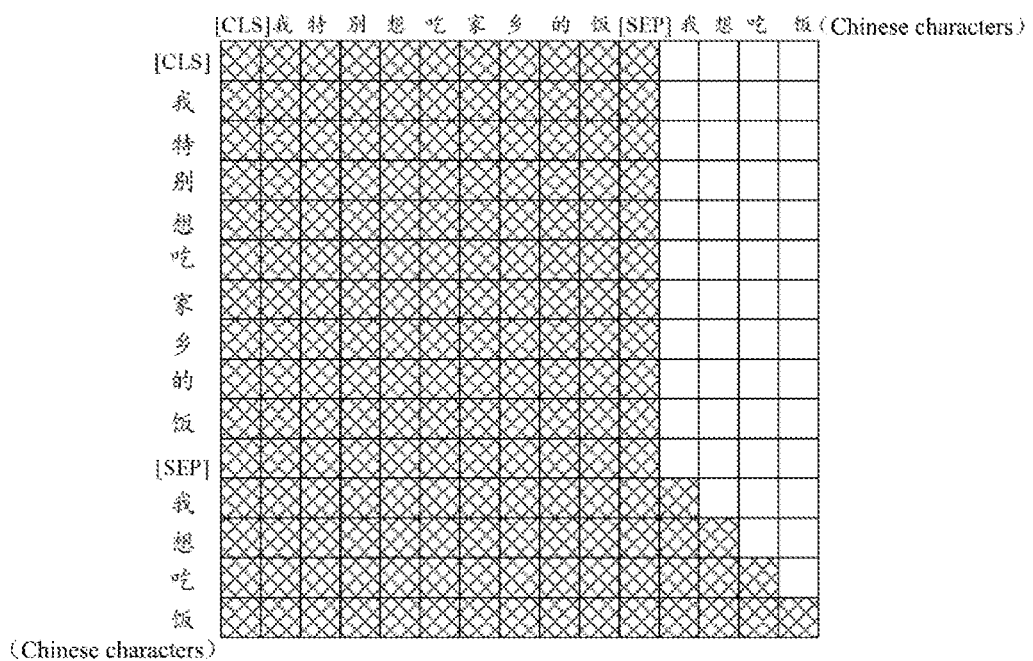
FIG. 4 is a schematic diagram of yet another attention matrix according to an embodiment of the present application.

As shown in FIG. 4, in this embodiment, the Chinese characters " 我特 别想吃家乡的饭 " are also added to a prediction range, which results in that attention of the original sentence is unidirectional, that is, a mask matrix of corresponding part is lower triangular. However, the model only needs to predict the Chinese characters " 我想吃饭 ", and in one embodiment, a part of the mask of the original sentence is further removed to obtain a more suitable mask.

As shown in FIG. 4, in this case, attention of an input part is bidirectional, and attention of an output part is unidirectional, which meets requirements of Seq2Seq, and achieves a compact constraint. This provides an idea to complete Seq2Seq tasks with a single Bert model, as long as the mask of the foregoing shape is added without modifying model architecture, and Bert's masked language model (MLM) can be directly used to pre-train weights, which converge faster.

The Bert model used in this embodiment is a natural language processing (NLP) pre-training model proposed by google Corporation, and can be applied to processing of a language understanding model. However, the Bert model uses an absolute position coding vector trained from random initialization, and a general maximum position number value is set as 512, so that at most only 512 tokens can be processed. Therefore, based on the Bert model, a long text cannot be processed directly, and the long text can only be processed by truncation method or extraction method, which may cause a part of the text to be lost, resulting in poor summary generation for the text.

Figure 5:
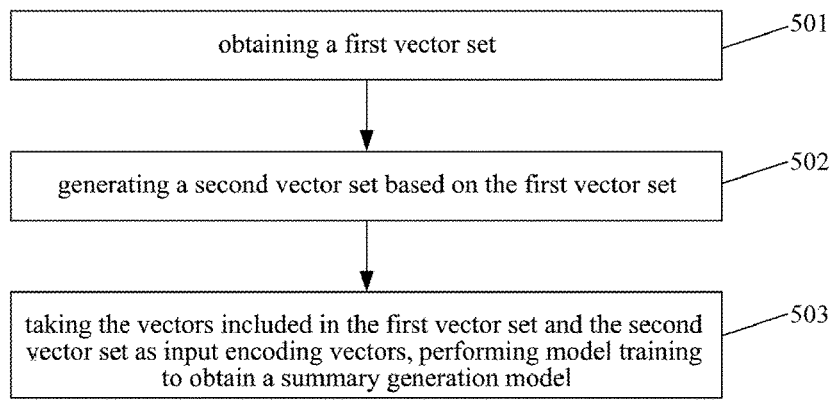
FIG. 5 is a flow chart of a summary generation model training method according to an embodiment of the present application.

In one embodiment, as shown in FIG. 5, the summary generation model training method includes the following steps 501 to 503.

Step 501: obtaining a first vector set.

In this embodiment, vectors in the first vector set are original encoding vectors which have been trained, i.e., the foregoing absolute position coding vectors of the Bert model. In this embodiment, one method for obtaining the first vector set may refer to the related art and will not be further defined and described herein.

Step 502: generating a second vector set based on the first vector set.

In this embodiment, based on the first vector set, the second vector set including a larger number of vectors is obtained. It can be appreciated that the number of vectors in the second vector set is greater than the number of vectors in the first vector set, and each vector in the second vector set is determined according to one or more vectors in the first vector set.

In this way, in this embodiment, the first vector set and the second vector set are obtained based on the original first vector set, thereby expanding the number of encoding vectors supported by the Bert model. As a result, a longer text can be directly processed, thereby improving the processing effect on the text.

In some embodiments, the first vector set includes N vectors, where N is a positive integer. Specifically, for example, N may be 512. Further, the second vector set includes N*N vectors. Then, a total of N*(N+1) vectors are used as input encoding vectors, thereby increasing a length of an input text.

In some embodiments, the step 502 includes:
determining the second vector set with the following formula:

$$q_{i \times n+j} = \alpha p_{(Imax+1-i)} + (1-\alpha) p_j;$$

where $q_{i \times n+j}$ is a vector in the second vector set; $p_{(Imax+1-i)}$ and $p_j$ are vectors in the first vector set; Imax is a maximum position number value of the original encoding vector; $\alpha$ is a preset coefficient or a super-parameter, $0 < \alpha < 1$, and $\alpha$ is not equal to 0.5. In this embodiment, the maximum position number value of the absolute position encoding vector of the Bert model is set to be 512, and thus, Imax is equal to 512 in this embodiment. Apparently, when the model used changes, or when the maximum position number value of the absolute position encoding vector corresponding to the model changes, the value of Imax is also adjusted accordingly. Generally, in order to facilitate calculation, the value range of $\alpha$ is set as $0 < \alpha < 0.5$.

Figure 6:
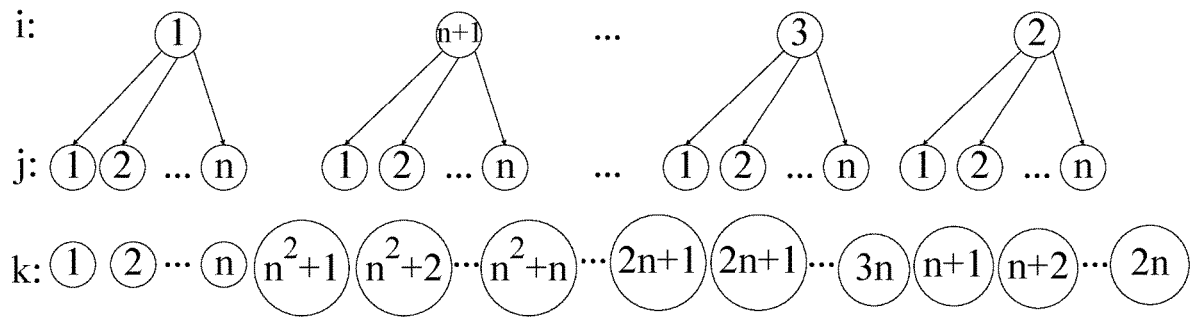
FIG. 6 is a schematic diagram of encoding according to an embodiment of the present application.

As shown in FIG. 6, in this embodiment, it can be understood that a position $(i-1) \times n+j$ is represented hierarchically as $(i, j)$, then position codes corresponding to i and j are $\alpha p_{(513-i)}$ and $(1-\alpha) p_j$, respectively, and finally, the code vector of $i \times n+j$ is superposition of the two. In this way, encoding of N*N positions in the second vector set can be represented by N parameters in the first vector set.

Further, in order to match the representation of the vectors in the second vector set, in this embodiment, the vectors in the first vector set may be represented as $q_i$, and $q_i = p_i$, where $i=1, 2, \ldots N$. It can be understood that $q_i$ to $q_N$ are corresponding to $p_i$ to $p_N$ in a one-to-one manner.

Step 503: taking the vectors included in the first vector set and the second vector set as input encoding vectors, performing model training to obtain a summary generation model.

Finally, the second vector set and the first vector set are used as input encoding vectors of the Bert model. That is, in this embodiment, the first vector set including N vectors and the second vector set including N*N vectors are actually used as inputs, and therefore, in this embodiment, input encoding vectors including N*(N+1) vectors are obtained.

In some embodiments, the step 503 includes:
in case that the number of words of a text for which a summary is needed to be generated, is less than or equal to a pre-set word number threshold, taking vectors included in the first vector set as input encoding vectors to perform model training;

in case that the number of words of the text for which the summary is needed to be generated, is greater than the pre-set word number threshold, sequentially arranging vectors included in the first vector set and vectors included in the second vector set as input encoding vectors to perform model training.

In the technical solution of this embodiment, the foregoing pre-set word number threshold is equal to the number of absolute position encoding vectors of the Bert model, and thus when the number of words in an original text is less than or equal to the pre-set word number threshold, the implementation thereof is substantially the same as the method in the related art; and when the number of words of the text for which the summary is needed to be generated, is greater than the pre-set word number threshold, the number of vectors in the first vector set and the second vector set will increase with the increase in the number of words of the text, thereby satisfying requirements of model training.

In the embodiment of the present application, the second vector set is generated through trained original encoding vectors; since the second vector set is generated based on the first vector set, the second vector set has compatibility with the first vector set. Further, performing model training with the first vector set and the second vector set can increase a length of an input text, which facilitates generation of a summary of a long text.

One embodiment of the present application provides a summary generation model training apparatus.

Figure 7:
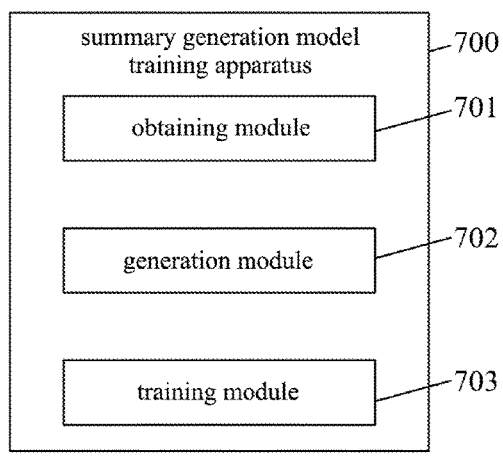
FIG. 7 is a block diagram of a summary generation model training apparatus according to an embodiment of the present application.

As shown in FIG. 7, in one embodiment, the summary generation model training apparatus 700 includes:
an obtaining module 701 configured to obtain a first vector set, where vectors in the first vector set are original encoding vectors which have been trained;
a generation module 702 configured to generate a second vector set based on the first vector set; where the number of vectors in the second vector set is greater than the number of vectors in the first vector set, and each vector in the second vector set is determined according to one or more vectors in the first vector set;
a training module 703 configured to take the vectors included in the first vector set and the second vector set as input encoding vectors to perform model training to obtain a summary generation model which is a neural network model with an input encoding vector of a text as an input and a summary of the text as an output.

Optionally, the first vector set includes N vectors, and the second vector set includes N*N vectors, and N a positive integer.

Optionally, the generation module 702 is specifically configured to:
determine the second vector set with the following formula:

$$q_{i \times n+j} = \alpha p_{(Imax+1-i)} + (1-\alpha) p_j;$$

where $q_{i \times n+j}$ is a vector in the second vector set; $p_{(Imax+1-i)}$ and $p_j$ are vectors in the first vector set; Imax is a maximum position number value of the original encoding vector; $\alpha$ is a preset coefficient, $0 < \alpha < 1$, and $\alpha$ is not equal to 0.5.

Optionally, the training module 703 includes:
a first training sub-module configured to, in case that the number of words of a text for which a summary is needed to be generated, is less than or equal to a pre-set word number threshold, take vectors included in the first vector set as input encoding vectors to perform model training;

a second training sub-module configured to, in case that the number of words of the text for which the summary is needed to be generated, is greater than the pre-set word number threshold, sequentially arrange vectors included in the first vector set and vectors included in the second vector set as input encoding vectors to perform model training.

The summary generation model training apparatus of the present application can implement various steps of the embodiments of the summary generation model training method described above and achieve substantially the same or similar technical effects, and will not be described in detail herein.

One embodiment of the present application further provides an electronic device, which includes a processor and a memory. The processor executes a program stored on the memory to implement the steps of any of the foregoing summary generation model training method.

One embodiment of the present application further provides a non-transitory computer readable storage medium, which includes a computer program stored thereon. The computer program is executed by a processor to cause the processor to implement the steps of any of the foregoing summary generation model training method.

The above descriptions are merely some embodiments of the present disclosure. It should be noted that for those of ordinary skill in the art, without departing from the principles of the present disclosure, various improvements and modifications can be made. These improvements and modifications should fall within the protection scope of the present disclosure.

What is claimed is:

1. A summary generation model training method, comprising:
   obtaining a first vector set, wherein vectors in the first vector set are original absolute position embeddings vector of a BERT model;
   generating a second vector set based on the first vector set, wherein the number of vectors in the second vector set is greater than the number of the vectors in the first vector set, and each vector in the second vector set is determined according to one or more vectors in the first vector set; and
   taking the vectors included in the first vector set and the vectors included in the second vector set as input encoding vectors to perform model training to obtain a summary generation model,
   wherein the summary generation model is a neural network model with vectors of a text as input encoding vectors and a summary of the text as an output, wherein the first vector set includes N vectors, and the second vector set includes N*N vectors, and N a positive integer greater than 1,
   wherein the generating a second vector set based on the first vector set, includes:
   determining the second vector set with the following formula:

$$q_{i \times n+j} = \alpha p_{(Imax+1-i)} + (1-\alpha)p_j,$$

wherein $q_{i \times n+j}$ is a vector in the second vector set, $p_{(Imax+1-i)}$ and $p_j$ are vectors in the first vector set, Imax is a maximum position number value of the absolute position embeddings vectors of the BERT model, $\alpha$ is a preset coefficient, $0<\alpha<1$, and a is not equal to 0.5.

2. The method according to claim 1, wherein the taking the vectors included in the first vector set and the vectors included in the second vector set as input encoding vectors to perform model training to obtain a summary generation model, includes:
   in case that the number of words of the text for which a summary is needed to be generated, is less than or equal to a pre-set word number threshold, taking the vectors included in the first vector set as input encoding vectors to perform model training;
   in case that the number of words of the text for which the summary is needed to be generated, is greater than the pre-set word number threshold, sequentially arranging the vectors included in the first vector set and the vectors included in the second vector set as input encoding vectors to perform model training.

3. An electronic device, comprising: a processor and a memory, wherein the processor is configured to execute a program stored on the memory to implement:
   obtaining a first vector set, wherein vectors in the first vector set are absolute position embeddings vector of a BERT model;
   generating a second vector set based on the first vector set, wherein the number of vectors in the second vector set is greater than the number of the vectors in the first vector set, and each vector in the second vector set is determined according to one or more vectors in the first vector set; and
   taking the vectors included in the first vector set and the vectors included in the second vector set as input encoding vectors to perform model training to obtain a summary generation model, wherein the summary generation model is a neural network model with vectors of a text as input encoding vectors and a summary of the text as an output, wherein the first vector set includes N vectors, and the second vector set includes N*N vectors, and N a positive integer greater than 1,
   wherein the generating a second vector set based on the first vector set, includes:
   determining the second vector set with the following formula:

$$q_{i \times n+j} = \alpha p_{(Imax+1-i)} + (1-\alpha)p_j,$$

wherein $q_{i \times n+j}$ is a vector in the second vector set, $p_{(Imax+1-i)}$ and $p_j$ are vectors in the first vector set, Imax is a maximum position number value of the absolute position embeddings vectors of the BERT model, $\alpha$ is a preset coefficient, $0<\alpha<1$, and $\alpha$ is not equal to 0.5.

4. The electronic device according to claim 3, wherein when taking the vectors included in the first vector set and the vectors included in the second vector set as input encoding vectors to perform model training to obtain a summary generation model, the processor is configured to execute the program stored on the memory to implement:
   in case that the number of words of the text for which a summary is needed to be generated, is less than or equal to a pre-set word number threshold, taking the vectors included in the first vector set as input encoding vectors to perform model training;
   in case that the number of words of the text for which the summary is needed to be generated, is greater than the pre-set word number threshold, sequentially arranging the vectors included in the first vector set and the vectors included in the second vector set as input encoding vectors to perform model training.

5. A non-transitory computer-readable storage medium, comprising a computer program stored thereon, wherein the computer program is executed by a processor to cause the processor to implement:

obtaining a first vector set, wherein vectors in the first vector set are absolute position embeddings vector of a BERT model;

generating a second vector set based on the first vector set, wherein the number of vectors in the second vector set is greater than the number of the vectors in the first vector set, and each vector in the second vector set is determined according to one or more vectors in the first vector set; and taking the vectors included in the first vector set and the vectors included in the second vector set as input encoding vectors to perform model training to obtain a summary generation model, wherein the summary generation model is a neural network model with vectors of a text as input encoding vectors and a summary of the text as an output, wherein the first vector set includes N vectors, and the second vector set includes N*N vectors, and N a positive integer greater than 1, wherein the generating a second vector set based on the first vector set, includes:

determining the second vector set with the following formula:

$$q_{i \times n+j} = \alpha p_{(Imax+1-i)} + (1-\alpha)p_j,$$

wherein $q_{i \times n+j}$ is a vector in the second vector set, $p_{(Imax+1-i)}$ and $p_j$ are vectors in the first vector set, Imax is a maximum position number value of the absolute position embeddings vectors of the BERT model, $\alpha$ is a preset coefficient, $0<\alpha<1$, and $\alpha$ is not equal to 0.5.

6. The non-transitory computer-readable storage medium according to claim 5, wherein when taking the vectors included in the first vector set and the vectors included in the second vector set as input encoding vectors to perform model training to obtain a summary generation model, the computer program is executed by a processor to cause the processor to implement:

in case that the number of words of the text for which a summary is needed to be generated, is less than or equal to a pre-set word number threshold, taking the vectors included in the first vector set as input encoding vectors to perform model training;

in case that the number of words of the text for which the summary is needed to be generated, is greater than the pre-set word number threshold, sequentially arranging the vectors included in the first vector set and the vectors included in the second vector set as input encoding vectors to perform model training.

* * * * *